(12) United States Patent
Morando (10) Patent No.: US 7,445,018 B1
(45) Date of Patent: Nov. 4, 2008

(54) RECYCLING FURNACE FLOW MANAGEMENT SLIDING GATE VALVE FOR LOW MELTING TEMPERATURE METALS

(76) Inventor: Jorge A. Morando, 33125 Wintergreen Dr., Solon, OH (US) 44139

( * ) Notice: Subject to any disclaimer, the term of this patent is extended or adjusted under 35 U.S.C. 154(b) by 0 days.

(21) Appl. No.: 11/943,905

(22) Filed: Nov. 21, 2007

(51) Int. Cl.
*F16K 51/00* (2006.01)
(52) U.S. Cl. .................. 137/242; 137/244; 137/15.07; 251/326
(58) Field of Classification Search ............... 137/244, 137/242, 15.07; 251/326, 327, 329
See application file for complete search history.

(56) References Cited

U.S. PATENT DOCUMENTS

| | | | | |
|---|---|---|---|---|
| 4,546,788 A | * | 10/1985 | Stalder et al. | 137/242 |
| 4,909,272 A | * | 3/1990 | Carpentier | 137/244 |
| 5,255,893 A | * | 10/1993 | Peterson | 251/328 |
| 7,044,153 B2 | * | 5/2006 | Klein et al. | 137/244 |

* cited by examiner

*Primary Examiner*—Kevin L Lee
(74) *Attorney, Agent, or Firm*—Steve M. Clemmons (57) ABSTRACT

A sliding gate valve for use within a bath of molten aluminum. The sliding gate valve includes a pair of opposed ceramic cleaner plates that sandwich a reciprocable gate body. The cleaner plates include a plurality of longitudinal slots that face the gate body. Dross accumulating on the gate body is scraped from the gate body and into the slots when the gate body is reciprocated.

14 Claims, 7 Drawing Sheets

RECYCLING FURNACE FLOW MANAGEMENT SLIDING GATE VALVE FOR LOW MELTING TEMPERATURE METALS

FIELD OF THE INVENTION

The present invention relates to the transfer of molten metal and, more particularly, to the construction of a recycling furnace flow control apparatus including a molten metal immersible sliding gate valve that re-directs the flow from a dual circulation/transfer pump from circulating a molten metal bath to transferring the molten metal out of the furnace.

BACKGROUND OF THE INVENTION

Sliding gate valves are well known in the steel-making industry for controlling the flow of molten steel. These types of valves, however, are not used in the processing relatively low melting temperature metals, such as aluminum or zinc, due to the valves becoming clogged and jammed by solid contaminants or dross found in the molten metal bath. Cleaning or repairing the contaminants from the valve would be too time-consuming and expensive. There is therefore a need for an improved sliding gate valve that will operate immersed in a molten metal bath of aluminum, while preventing dross accumulation or build-up.

A typical molten metal facility includes a furnace with one or more pumps for moving molten metal. During the processing of molten metals, such as aluminum, the molten metal is normally continuously circulated through the furnace by a centrifugal impeller pump, i.e., a circulation pump, to equalize the temperature of the molten bath. A typical furnace includes a pump well that is located between the heating chamber or hearth and the charge well (where raw material is inserted into the furnace). These three main sections of a typical furnace are fluidly interconnected with the circulation pump causing the molten metal to circulate from the pump well to the charge well to the hearth and back into the pump well.

To transfer the molten metal out of the furnace, typically for casting the metal, a second transfer pump is used to elevate the metal up through a discharge conduit that runs up and out of the furnace.

The pump well typically includes the circulation pump and, if there is enough space, the separate transfer pump. If there is not enough room in a particular furnace's pump well, the circulation pump must be removed and replaced with the transfer pump when retrieving/pouring molten metal from the furnace.

While the current two pump system is effective for its intended purpose, purchasing and maintaining two separate pumps is expensive and inefficient, particularly when the two pumps must be swapped out in smaller pump wells. There is therefore a need for a device that can be immersed in a bath of molten metal that can selectively redirect the output from a single pump from the circulation of the metal within the furnace to transferring the metal out of the furnace.

SUMMARY OF THE INVENTION

The present invention provides a self-cleaning sliding gate valve that is immersible in a flowing bath of molten metal containing dross. The sliding gate valve includes a reciprocable blade having a pair of parallel opposed walls and a molten metal orifice passing between the walls, wherein some of the dross accumulates upon the blade; and a pair of stationary cleaner plates, each having a molten metal orifice and a planar inner surface that faces and abuts one of the blade walls. The inner surfaces include at least one recessed slot that runs the length of the blade. Additionally, the blade is slidably movable between a valve open position and a valve closed position to control the flow of the molten metal, wherein the sliding movement scrapes the accumulated dross from the blade into the recessed slot.

The present invention further provides a valve for controlling the flow of a bath of molten metal. This valve includes: a reciprocable blade having a molten metal orifice; a stationary upstream cleaner plate having a molten metal orifice and including a planar downstream face having means formed within the downstream face for scraping dross from an abutting surface; a stationary downstream cleaner plate having a molten metal orifice and including a planar upstream face having means formed within the upstream face for scraping dross from an abutting surface; and a valve body having a gate recess shaped to receive the cleaner plates and the blade. Wherein the blade is sandwiched between the upstream cleaner plate and the downstream cleaner plate within the gate recess, whereby reciprocating the blade between the plates scrapes off any dross from the molten metal bath that accumulated onto the blade.

The present invention also provides a method for cleaning dross from a sliding gate valve immersed within a bath of molten metal. The method includes the steps of: forming a plurality of recessed slots along a longitudinal length of a pair of cleaning plates; placing the pair of planar cleaning plates in a spaced parallel relationship within a valve body, whereby the recessed slots face toward each other; sandwiching a reciprocable blade between the cleaning plates; and reciprocating the blade between the plates across the longitudinal length of the slots to scrape any dross from the blade into the slots.

In the preferred embodiment, a molten metal transfer device is provided. The device includes a sliding gate valve that selectively redirects the output from a circulation pump from circulating the molten metal to elevating the molten metal up and out of a riser conduit disposed in the device upstream of the valve.

The present invention is intended to operate within a flow control system for a furnace containing a bath of molten metal that is selectively circulated within said furnace or transferred out of said furnace by a pump. Closing the valve redirects the pump's output to the transfer conduits out of the furnace, while opening the valve causes the flow to re-circulate through the furnace.

It is an advantage of the present invention to provide a sliding gate valve that is operable while immersed in a bath of molten aluminum. Present sliding gate valves cannot be used in such a medium due to the movable gate becoming quickly jammed with accumulated dross.

It is another advantage of the present invention that the sliding gate valve will automatically clean accumulated dross from the blade each time the blade is reciprocated between the open-valve and closed-valve positions.

It is still another advantage that present invention allows a single pump to either circulate a bath of molten aluminum within a furnace or to transfer the molten aluminum out of the furnace.

These and other objects, features and advantages of the present invention will become apparent from the following description when viewed in accordance with the accompanying drawings and appended claims.

BRIEF DESCRIPTION OF THE DRAWINGS

The description refers to the accompanying drawings in which like reference characters refer to like parts throughout the several views, and in which.

DETAILED DESCRIPTION OF THE PREFERRED EMBODIMENT

A conventional furnace is generally shaped as a fluid retaining enclosure. This enclosure includes a heating area or hearth, a pump well that contains a molten metal pump 5 and a charge well. A bath 7 of molten metal is contained within the furnace. A series of arches fluidly connect the hearth, pump well and charge well allowing the molten metal to flow through the furnace. During normal operation, the bath 7 is heated in the hearth, pulled into the pump well by pump 5 and accelerated out from the pump and into the charge well to circulate the molten metal through the furnace.

Pump 5 is typically a centrifugal impeller pump adapted to be immersed in molten metal. Pump 5 rotates an impeller to draw in and expel the molten metal forming bath 7. One example of such a pump is the type disclosed in my pending U.S. patent application Ser. No. 11/337,266 entitled HIGH FLOW/DUAL INDUCER/HIGH EFFICIENCY IMPELLER FOR LIQUID APPLICATIONS INCLUDING MOLTEN METAL which is incorporated herein by reference, word for word and paragraph for paragraph. It should be appreciated that while pump 5 is being described as a centrifugal impeller-type of pump, it can be substantially any style pump suitable for use in a molten metal environment.

Referring now to FIGS. 1-5, a preferred molten metal sliding gate valve 10 for a central melting or holding furnace is illustrated and comprises a body 12, a blade or gate 14, and a pair of cleaner plates 16 and 18, and a riser 20.

Blade 14 is a generally flat rectilinear plate having two parallel walls 22, 24. Blade 14 includes a molten metal orifice 25 that passes through blade 14 between walls 22, 24. Orifice 25 has a shape and size that is substantially the same as the outlet 5' of pump 5. In the exemplary version illustrated in the FIGs., orifice 25 has a rounded rectangle shape. The length of the rounded rectangle running parallel to the transverse edges 26 of blade 14 (i.e., the edges 26 that run perpendicular to the sliding direction of blade 14). A piston rod 27 is mounted to one edge of blade 14. Piston rod 27 is mounted to an actuator (not shown), such as a hydraulic ram or hand wheel that causes the piston rod and blade 14 to translate linearly.

Valve 10 also includes pair of substantially identical cleaner plates 16, 18. Each cleaner plate 16, 18 is preferably a generally flat body 28 having a front bearing or cleaning surface 30 and a rear mounting surface 32. A molten metal orifice 35, substantially the same as orifice 25 in size and shape passes between surfaces 30, 32.

Figure 1:
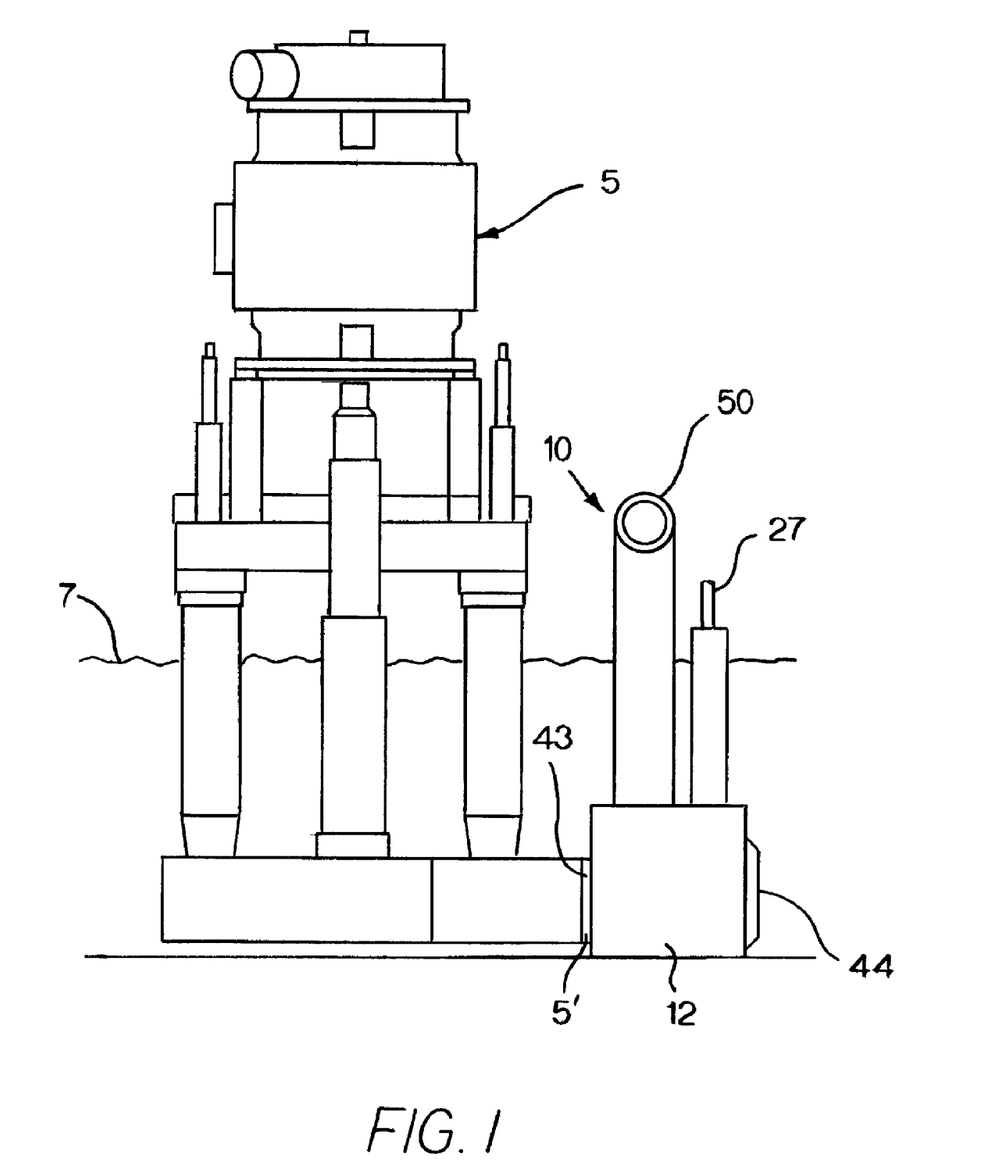
FIG. 1 is aside view of the preferred embodiment of the invention immersed within a bath of molten metal and mounted to the outlet of a centrifugal impeller pump.
Figure 2:
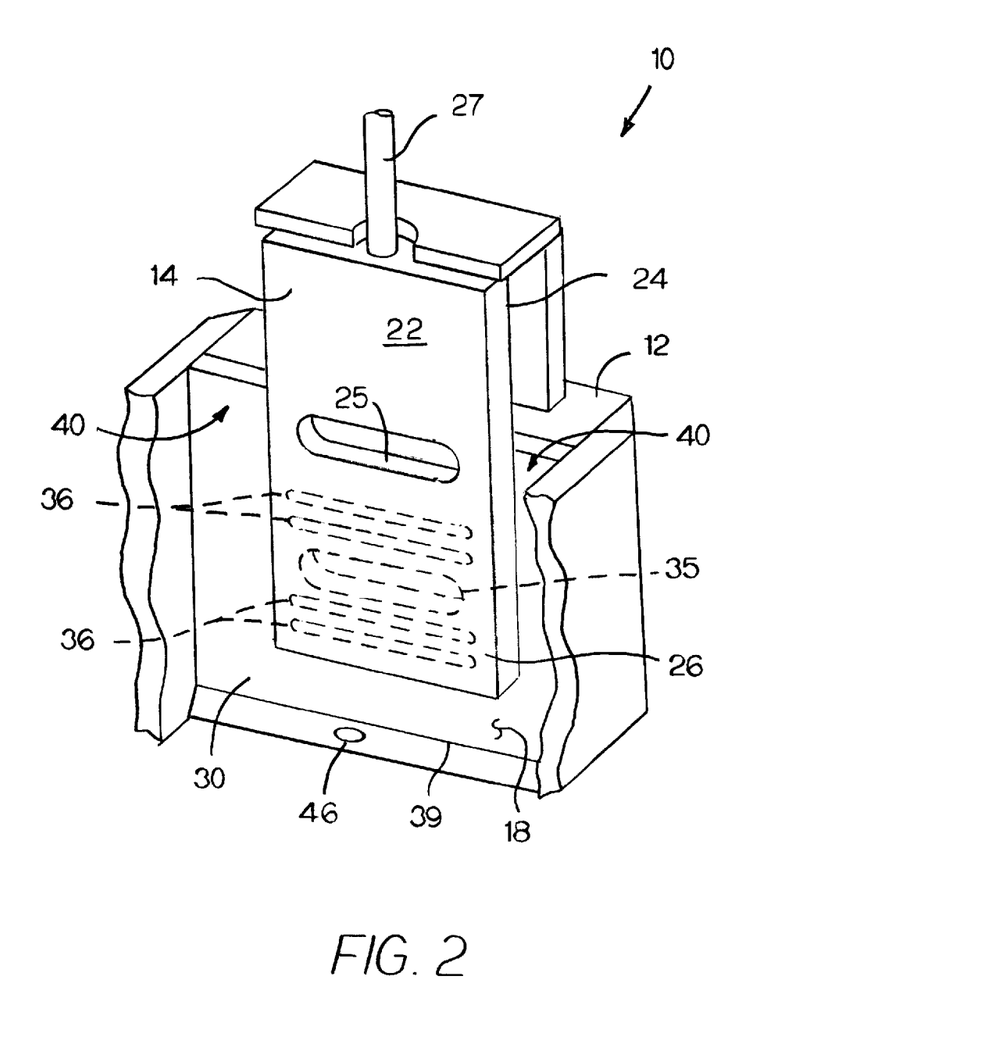
FIG. 2 is a partial cut-away perspective view of the sliding gate valve in a closed position.
Figure 3:
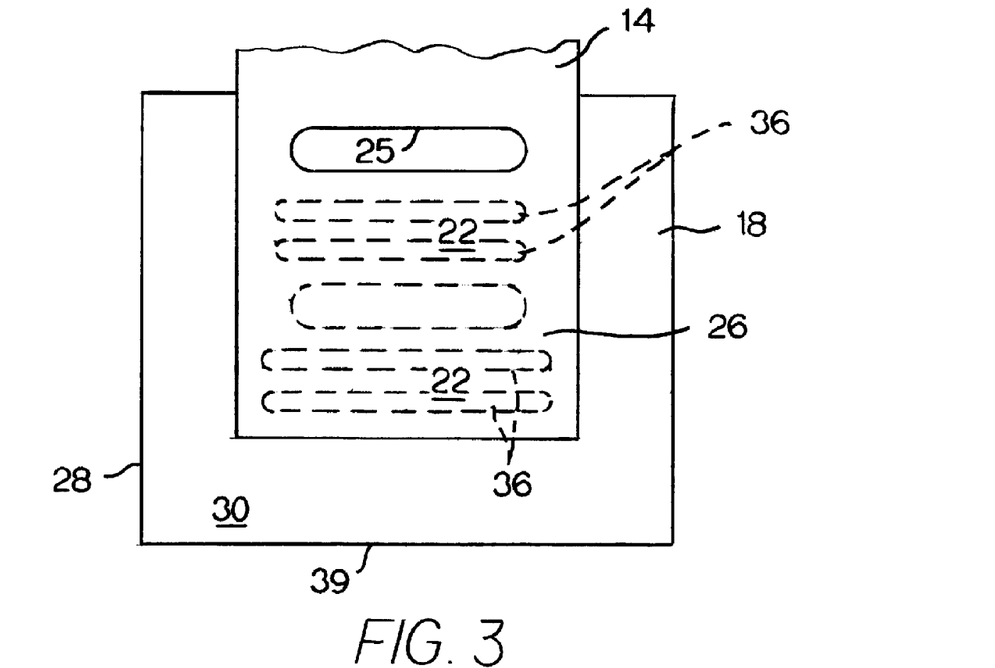
FIG. 3 is front view of the blade and one of the cleaner plates in a closed position.
Figure 4:
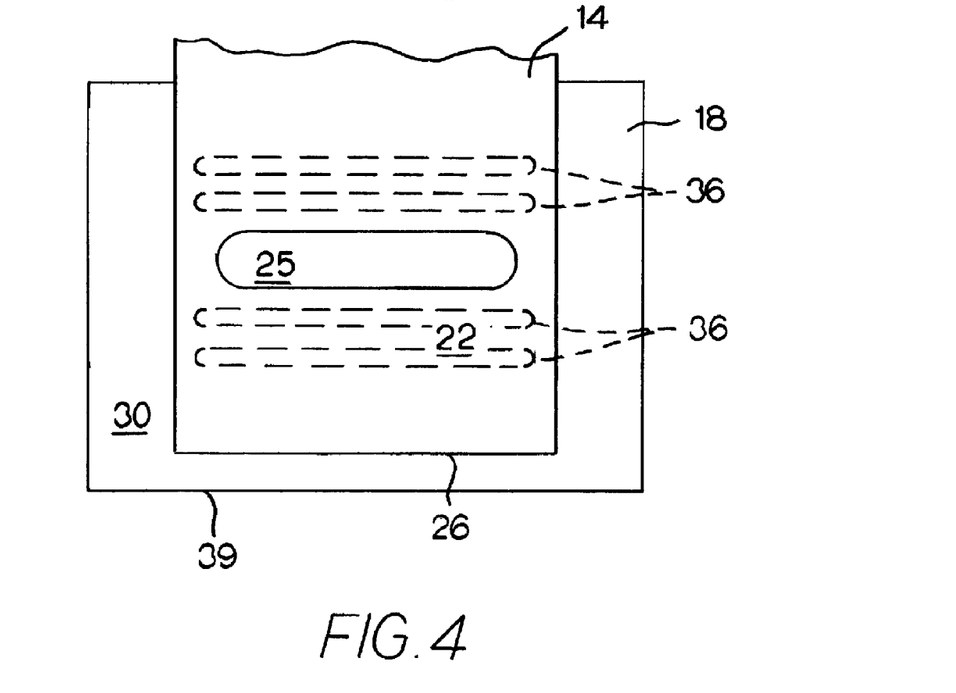
FIG. 4 is a front view of the blade and one of the cleaner plates in an open position.
Figure 5:
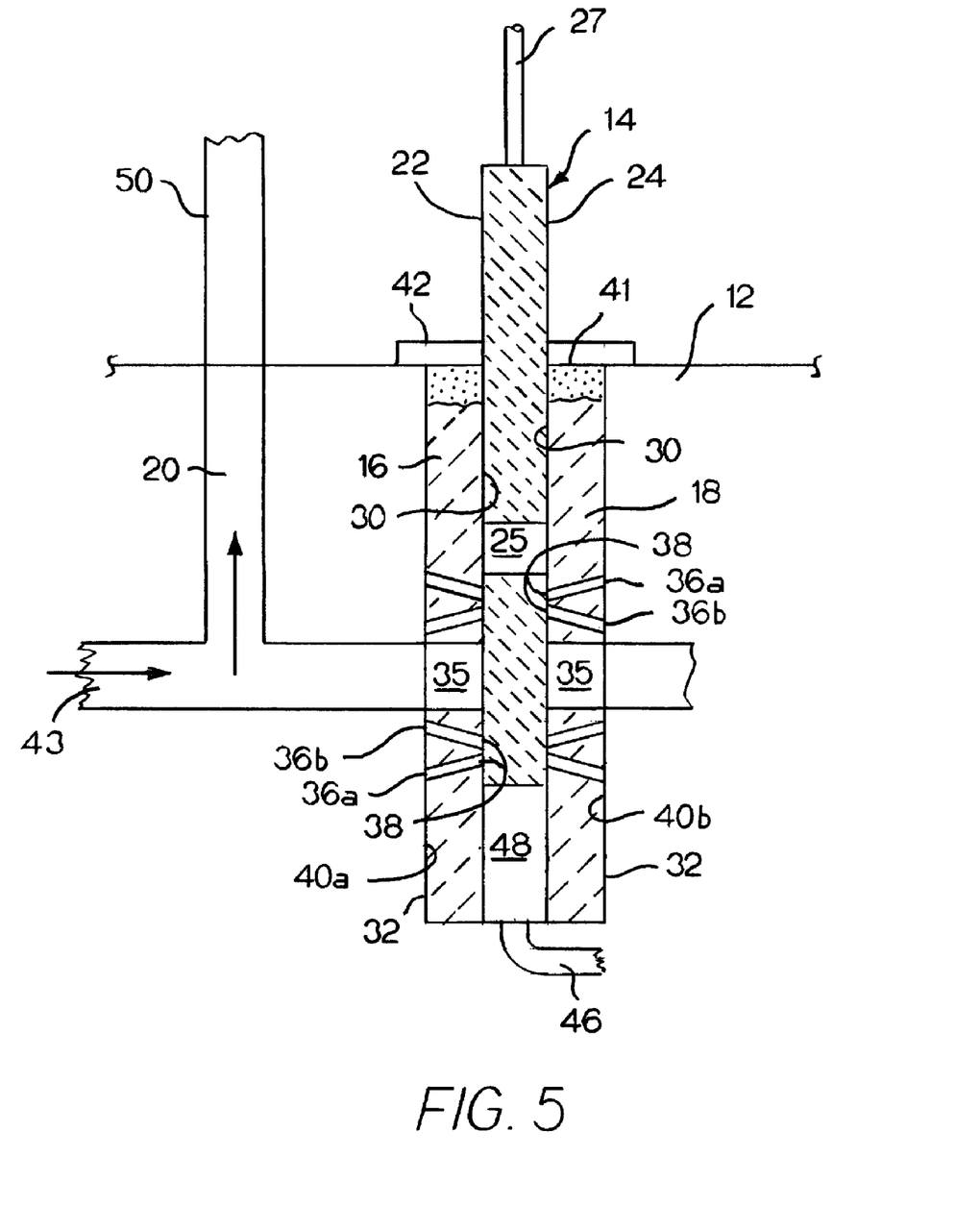
FIG. 5 is a side sectional view of the blade and cleaner plates in a closed position to direct the flow of molten metal up through an upstream riser conduit.
Figure 6:
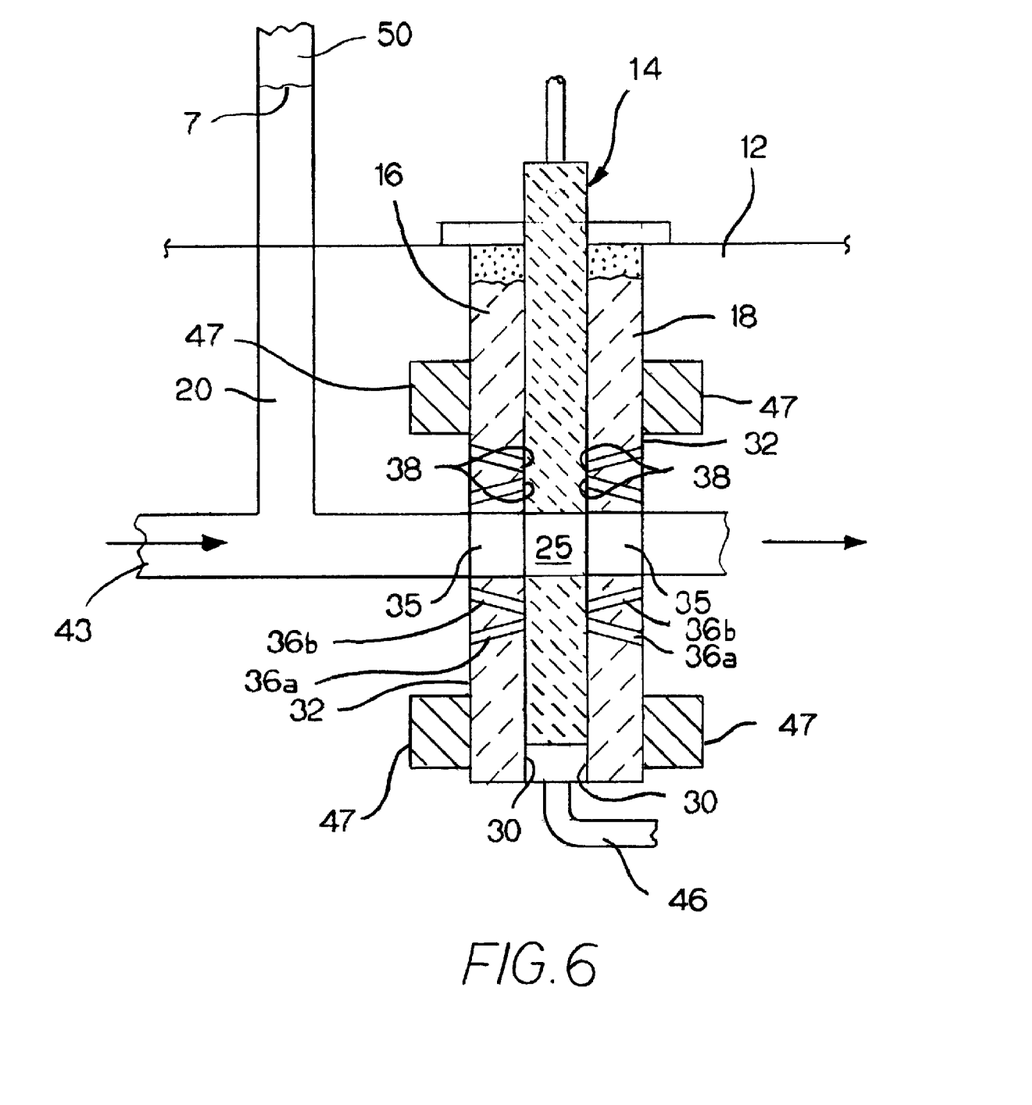
FIG. 6 is a side sectional view of the blade and cleaner plates in an open position causing the flow of molten metal to pass through the sliding gate valve.

Importantly, each cleaner plate 16, 18 includes a plurality of recessed cleaning or wiping slots 36 formed in cleaning face or surface 30. Each slot 36 is a relatively narrow channel that is slightly shorter than the width of blade 14. As best shown in FIGS. 5 and 6, these cleaning slots are preferably tapered such that some slots, denoted 36a, angle from slot opening 38 at surface 30 away from orifice 35, while other slots, denoted 36b, angle from slot opening 38 toward orifice 35. Slots 36 are formed in plates 16, 18 running parallel to the longitudinal length of orifice 35 and to the transverse edges 39 of the plates.

Figure 8:
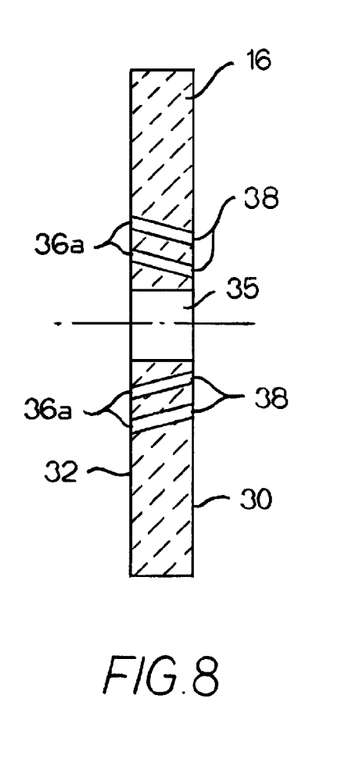
FIG. 8 is a side sectional view of an alternate cleaner plate.
Figure 9:
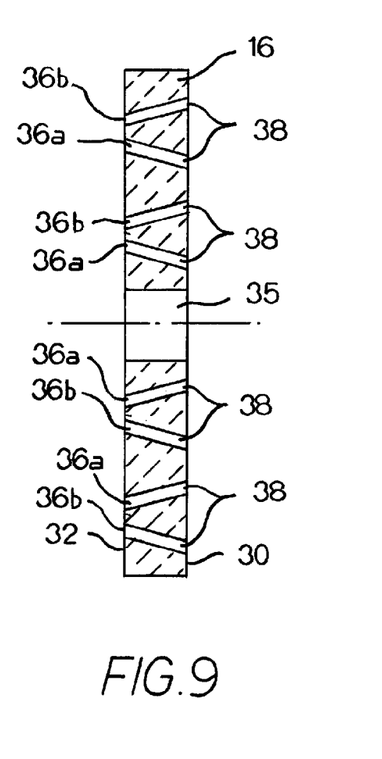
FIG. 9 is a side sectional view of another alternate cleaner plate.

At least one of the slots 36 are preferably located on each side of orifice 35. In the embodiment illustrated in FIGS. 5 and 6, one of each slot 36a and 36b are located above and below orifice 35. In other embodiments, shown in FIGS. 8 and 9, various arrangements and quantities of slots 36a, 36b may be formed within the cleaner plates.

Body 12 includes a recessed gate well 40 which provides a fixed width to receive cleaner plates 16, 18 and blade 14. Upon assembly, cleaner plates 16, 18 sandwich blade 14 within well 40, such that walls 22 and 24 abut face-wise the cleaning surface 30 of the two cleaner plates. Cleaner plates 16, 18 are mounted to body 12 remaining stationary relative to the sliding or reciprocating movement of blade 14. A fibrous high temperature compressible gasket material 41 is placed around blade 14 and is held within body 12 by a cover plate 42.

Body 12 includes a molten metal inlet 43 that is in fluid communication with orifice 35 of cleaner plate 16 and a molten metal outlet 44 that is in fluid communication with orifice 35 of cleaner plate 18. It should be appreciated that inlet 43 is sized and shaped to receive molten metal flowing from pump 5, such that cleaner plate 16 is positioned upstream relative to blade 14, while cleaner plate 18 is downstream of blade 14.

As best shown in FIGS. 5 and 6, the opposing upstream and downstream surfaces 40a and 40b, respectively of well 40 provide a mounting surface to which each respective plate 16 and 18 is removably mounted to by conventional means. A cleanout drain 46 is preferably located in body 12 accessing the gap 48 between cleaner plates 16, 18 not occupied by blade 14.

In one preferred embodiment, shown in FIG. 6, resilient members 47, such as compressed flexible graphite material sold under the Trademark Grafoil or the like, bias the cleaner plates away from well surfaces 40a, 40b and press cleaner faces 30 of cleaner plates 16, 18 against the blade 14.

Blade 14 and cleaner plates 16, 18 are preferably formed from a material suitable for immersion in molten aluminum, such as graphite or a ceramic material, such as silicon carbide or silicon nitride reaction boned silicon carbide. In a preferred embodiment, blade 14 is formed from graphite while cleaner plates 16 and 18 are formed from a ceramic material to facilitate the sliding interface between the face-wise abutting surfaces 22, 24 and 30. In other embodiments, blade 14 and plates 16 and 18 may be coated in a boron nitride paint which is highly resistant to molten aluminum and zinc and possesses a low coefficient of friction to facilitate sliding.

In one embodiment, a transfer riser conduit 20 is formed in valve body 12 and is in fluid communication with the flow of molten metal between inlet 43 and gate well 40 (i.e., upstream of cleaner plate 16). Riser conduit 20 runs generally vertically and is coupled to a transfer tube or piping 50 that runs away from the furnace.

In a typical melting or holding furnace, the recirculating molten metal pump are capable of building about ten to twelve feet of head, but only three to four feet are required for recirculating the metal. Transferring the metal, however, up and out of the furnace requires approximately seven to ten feet of head. It should be appreciated that valve 10 simplifies switching between circulating the molten metal within the furnace and transferring the metal out of the furnace. By closing valve 10, the flow of molten metal is forced out of the furnace. By opening valve 10 (i.e., aligning molten metal orifices 25 and 35, valve 10 automatically switches from transfer mode to circulation mode as the molten metal will naturally follow the path of least resistance, which due to the lower head pressure requirements of circulating the molten metal, will result in the metal flowing through the cleaner plate orifices 35 and blade orifice 25 and out of valve 10 through outlet 44.

Figure 7:
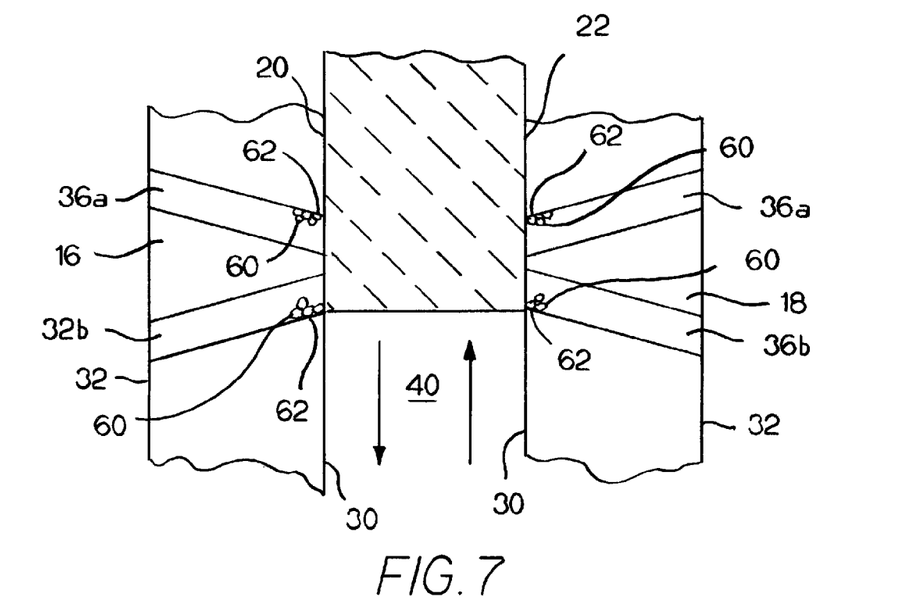
FIG. 7 is an enlarged side sectional view illustrating the cleaner slots of the cleaner plates scraping dross from the blade.

Referring now to FIG. 7, the face-wise abutting relationship of blade 14 and cleaner plates 16, 18 results in the cleaning slots 36a, 36b scraping any contaminants or dross 60 that accumulates on blade 14 (i.e., either on the wall surfaces 22 or 24, at the openings of orifice 25, and/or at the forward edge 26 of the blade) during operation in the molten bath 7. This cleaning or scraping motion is achieved when the blade 14 is reciprocated between the open position and the closed position. It should be appreciated that the edge 62 of slots 36a, 36b having a positive rake, i.e., the corner facing the oncoming sliding blade 14, removes any dross 60 that falls into slots 36 as the blade passes over that slot.

Figure 10:
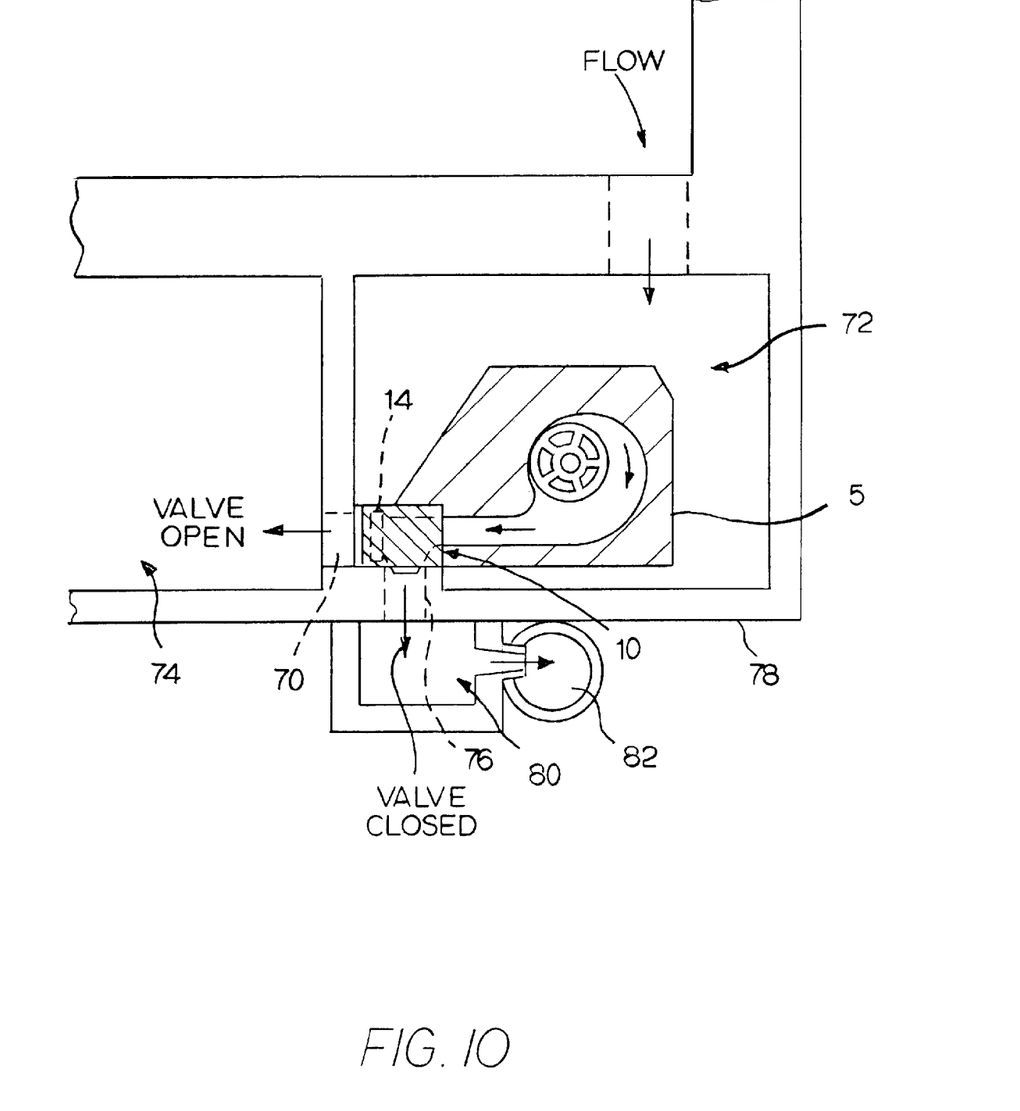
FIG. 10 is a top view of another application of the sliding gate valve which eliminates the transfer tube and discharges directly into an exterior transfer chamber.

Referring now to FIG. 10 an alternate transfer application of valve 10 is illustrated which eliminates the need for riser 20 to extend out of the molten metal bath 7 and eliminates transfer piping 50. In this embodiment, valve 10 is located such that when blade 14 is closed, the recirculation arch 70 which acts as a passage for the molten metal between the pump well 72 and the downstream charge well 74 is effectively blocked. The molten metal is discharged out of riser 20 back into the pump well 72 causing the level of the molten metal to rise within the pump well 72. A transfer spout or outlet 76 is formed in the outer wall 78 of the pump well at a height that is above the normal/recirculating level for the molten metal bath 7 in the furnace. A transfer chamber or well 80 is located downstream and beneath outlet 76 and receives the molten metal when the metal level exceeds the height of outlet 76. Transfer well 80 is fluidly coupled to means for further processing transferred molten metal, such as ladle 82.

In this embodiment, when valve 10 is opened, the molten metal will pass through valve outlet 44 and into charge well 74 to recirculate the molten metal in a conventional manner.

Such a pump as the type described in my above referenced patent application is particularly suited to be used in combination with the present invention as both a circulation pump and transfer pump as the high speed and output from this type of pump allows for a broad range of speeds and head pressures.

From the foregoing description, one skilled in the art will readily recognize that the present invention is directed to a self-cleaning sliding gate valve that automatically removes accumulated dross from the reciprocating gate body and methods for cleaning dross from a sliding gate valve immersed in a bath of molten metal.

While the present invention has been described with particular reference to various preferred embodiments, one skilled in the art will recognize from the foregoing discussion and accompanying drawing and claims that changes, modifications and variations can be made in the present invention without departing from the spirit and scope thereof as defined in the following claims.

The invention claimed is:

1. A self-cleaning sliding gate valve, immersible in a flowing bath of molten metal containing dross, comprising:
   a reciprocable blade having a pair of parallel opposed walls and a molten metal orifice passing between said walls, wherein some of said dross accumulates upon said blade; and
   a pair of stationary cleaner plates, each having a cleaner plate molten metal orifice and a planar inner surface that faces and abuts one of said blade walls, said inner surfaces including at least one recessed slot that runs the length of said blade;
   wherein said blade is slidably movable between a valve open position and a valve closed position to control the flow of said molten metal, wherein the sliding movement scrapes said accumulated dross from said blade into said recessed slot.

2. A self-cleaning sliding gate valve as defined in claim 1 further comprising:
   a valve body including a gate recess having opposed mounting surfaces, wherein one of each of said stationary cleaner plates is mounted to each of said mounting surfaces.

3. A self-cleaning sliding gate valve as defined in claim 2, wherein said cleaner plates are removably coupled to said mounting surfaces.

4. A self-cleaning sliding gate valve as defined in claim 2, further comprising a resilient member disposed between each of said cleaner plates and said mounting surface, said resilient members biasing said cleaner plates against said blade.

5. A self-cleaning sliding gate valve as defined in claim 1, wherein said at least one recessed slot include at least two recessed slots, a first of said recessed slots taper from a first slot opening in said inner surface away from said cleaner plate orifice, and a second of said recessed slots tapering from a second slot opening in said inner surface toward said cleaner plate orifice.

6. A self-cleaning sliding gate valve as defined in claim 2, wherein said valve body further includes a molten metal inlet that is in fluid communication with the molten metal orifice of the upstream cleaner plate, further comprising:
   a riser conduit fluidly coupled to said valve body between said inlet and said upstream cleaner plate.

7. A self-cleaning sliding gate valve as defined in claim 6, wherein said riser conduit extends out of said bath of molten metal.

8. A self-cleaning sliding gate valve as defined in claim 6, wherein said valve is disposed within a pump well downstream of a molten metal pump and wherein said valve closed position blocks the molten metal bath from flowing out of the pump well and causes molten metal to flow out of said riser conduit and back into said pump well, causing the height of said molten metal bath to rise.

9. A self-cleaning sliding gate valve as defined in claim 1, wherein said plates are a ceramic material.

10. A valve for controlling the flow of a bath of molten metal, comprising:

a reciprocable blade having a molten metal orifice;

a stationary upstream cleaner plate including a molten metal orifice passing through a planar downstream face having means formed within said downstream face adjacent to said molten metal orifice for scraping dross from an abutting surface;

a stationary downstream cleaner plate including a molten metal orifice passing through a planar upstream face having means formed within said upstream face adjacent to said molten metal orifice for scraping dross from an abutting surface; and a valve body having a gate recess shaped to receive said cleaner plates and said blade;

wherein said blade is sandwiched between said upstream cleaner plate and said downstream cleaner plate within said gate recess, whereby reciprocating said blade between said plates scrapes off any dross from said molten metal bath that accumulated onto said blade.

11. A valve as defined in claim 10, wherein each of said scraping means comprises:

a plurality of slots running along the length of the cleaner plate, wherein the dross scraped off of said blade is received within said slots.

12. A valve as defined in claim 11, wherein said plurality of slots within said upstream cleaner plate includes a first set of slots and a second set of slots and said plurality of slots within said downstream clean plate includes a third set of slots and a fourth set of slots;

wherein said first set of slots taper toward the molten metal orifice in said upstream cleaner plate from a first set of slot openings in said downstream face;

wherein said second set of slots taper away from the molten metal orifice in said upstream cleaner plate from a second set of slot openings in said downstream face;

wherein said third set of slots taper toward the molten metal orifice in said downstream cleaner plate from a third set of slot openings in said upstream face; and wherein said fourth set of slots taper away from the molten metal orifice in said downstream cleaner plate from a fourth set of slot openings in said upstream face.

13. A valve as defined in claim 10, wherein said valve body includes a riser conduit mounted upstream to said gate recess.

14. A valve as defined in claim 10, further comprising:

first resilient means mounted between said upstream cleaner plate and said valve body within said gate recess, said means biasing said upstream cleaner plate toward said blade; and second resilient means mounted between said downstream cleaner plate and said valve body within said gate recess, said means biasing said downstream cleaner plate toward said blade.

\* \* \* \* \*